United States Patent [19]

James

[11] Patent Number: 4,676,000

[45] Date of Patent: Jun. 30, 1987

[54] POWERED PALLET REPAIR TOOL

[75] Inventor: Raymond E. James, Chicago, Ill.

[73] Assignee: Brambles Industries, Ltd., Australia

[21] Appl. No.: 746,853

[22] Filed: Jun. 20, 1985

[51] Int. Cl.⁴ .............................................. B26B 17/00
[52] U.S. Cl. ....................................... 30/180; 30/228;
29/270; 29/426.4
[58] Field of Search .............. 30/180, 228, 353, 346.5,
30/173, 175, 177, 182, 241; 29/270, 426.4, 426.5

[56] References Cited

U.S. PATENT DOCUMENTS

| 17,128 | 4/1857 | Killmer et al. ................... 30/353 X |
| 2,714,250 | 8/1955 | Twedt ................................ 30/182 X |
| 3,828,431 | 8/1974 | Fleming et al. ....................... 30/228 |

Primary Examiner—Douglas D. Watts
Attorney, Agent, or Firm—Emrich & Dithmar

[57] ABSTRACT

A powered pallet repair tool for severing a fastener which fastens a deck board to a stringer of a pallet has a pair of cutting blades which are offset laterally relative to the axis of linearly reciprocating drive members which support the blades spaced apart sufficiently to straddle the stringer to facilitate locating the blades at the cutting line where the boards are fastened together. The cutting blades are driven into engagement during a cutting operation. The blades each have a bevelled surface leading away from the cutting edge to facilitate prying the deck board away from the stringer during a cutting cycle.

20 Claims, 6 Drawing Figures

POWERED PALLET REPAIR TOOL

BACKGROUND OF THE INVENTION

This invention relates to power driven tools and more particularly to a power driven tool for cutting nails which join together wooden members. The tool is particularly useful in repairing wooden pallets, but it has broader application such as in removing boards which form crates or boxes and the like.

In general, a wooden pallet of the type commonly used for storage, shipment or moving bulk items includes cross frame members called "stringers" to which are nailed spaced deck boards. The wood is normally a hardwood. The nails may be twist nails for better holding power, and they may be case-hardened.

Because of the rugged conditions in which pallets are used, the deckboards frequently crack or are broken. Pallets made of hardwood are fairly expensive, so it is desirable to repair them if possible, rather than replace the entire unit. Repair, to be economical, requires the ability quickly to remove individual boards which need to be replaced.

In separating the deck boards of pallets which are nailed to the stringers, it is common practice to use a pry bar as a lever to separate the boards. In doing so, the nails normally remain in the stringer; and the deck boards are pulled over the head of the nail. It thus requires considerable effort and strength to separate a deck board from a stringer, then each nail head is pulled through the deck board and there usually are six nails holding a deck board to a stringer. Removal is even more difficult if the nail is bent over the board. Moreover, once the board is removed, the shanks of the nails which project from the stringer where the board was removed, must be hammered into the stringer before another deck board can be fastened to it.

In repairing pallets, it is sometimes dififcult to use a pry bar because of the damage it can do to the stringer as well as to other deck boards, adjacent to the board being replaced. This particularly the case due to the limited space between boards, which is typically only a few inches. Thus, a good board may be broken as a result of trying to separate a broken board from a stringer.

Although nail cutting tools are available, such tools cannot be used for selectively removing boards from wooden pallets, because of the close spacing between the deck boards which prevents locating cutting blades at the point where the deck board being removed is fastened to a stringer. Further, such tools are not normally designed to cut hardened nails or to cut nails right at the location between the members it joins due to an inability to access that location.

SUMMARY OF THE INVENTION

The present invention provides a power driven tool for severing a metal fastener which fastens together two members extending in transverse direction. The power driven tool comprises a blade support means including a fixed jaw means and a movable jaw means, and first and second cutting blades each having a cutting edge and mounted on the fixed and movable jaw means respectively. The power driven tool further comprises a drive means operatively coupled to the blade support means for driving the movable jaw means relative to the fixed jaw means in linear motion between an open position and a closed position. The blade support means supports the cutting blades offset laterally relative to the axis of the drive means and with their cutting edges in opposing, parallel relation. The cutting blades are spaced apart when the movable jaw means is in the open position and abutting one another when the movable jaw means is in the closed position. Prior to acutation of the drive means, the cutting blades are spaced apart sufficiently to straddle the member remote from the drive means with their cutting edge extending along a cutting line where the members are fastened together by the fastener. The blades are located on opposite sides of the fasatener. When the drive means is then actuated to drive the movable jaw member to its closed position, the cutting blades are driven together, initially wedging said members apart then snipping the fastener located therebetween as the cutting edges of the cutting blades are driven into engagement.

The power driven tool provided by the present invention is particularly suitable for severing nails which join deck boards to the stringers of a wooden pallet. The spacing of the cutting edges of the first and second blades permits the opposing open blades to straddle a stringer of a pallet, allowing the blades to be maneuvered by the operator to the location where the deck board engages the stringer. The lateral offset mounting of the cutting blades enables them to fit beneath the width of a deck board while straddling a stringer to which the deck board is attached. Also, the power driven cutting action afforded by the cutting tool makes it simple to use and allows rapid removal of a broken board from a pallet, the tool merely being moved along the length of the board from stringer to stringer, cutting the nails which connect the board to the stringer.

DESCRIPTION OF THE PREFERRED EMBODIMENT

Figure 1:
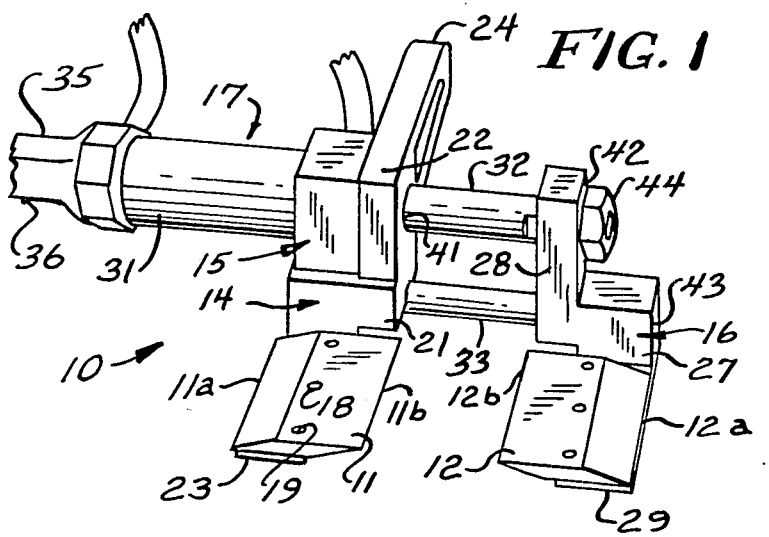
FIG. 1 is a perspective view of a power cutting tool provided by the present invention.

Referring to FIG. 1 of the drawings, the power driven tool 10 provided by the present invention includes a pair of cutting blades 11 and 12, a blade support apparatus 14 including a fixed jaw member 15 and a movable jaw member 16, and a drive apparatus 17. The power tool 10 may be hand held or machine mounted.

Figure 1A:
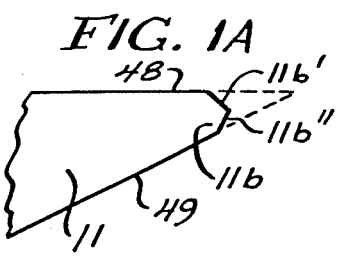
FIG. 1A is an enlarged fragmentary view of a cutting blade of the cutting tool of FIG. 1, illustrating the shape of the cutting edge.

The cutting blades 11 and 12 are identical in shape. Each cutting blade, such as cutting blade 11, is a flat, elongated rectangular member having opposite sides bevelled to define two cutting edges 11a and 11b for the blade. Each cutting edge, such as cutting edge 11b shown in FIG. 1A, is defined by portions 11b' and 11b" which taper inwardly at an angle of approximately 45 degrees relative to the planar surfaces 48 and 49.

Blade 11 is attached to the fixed jaw member 15 by way of machine screws 18 which pass through apertures 19 in blade 11. Blade 12 is attached to the movable jaw member 16 by screws 18' which pass through aperture 19' in the blade 12. With such construction, the blades are interchangeable, reversible and replaceable. The blades may be cast of steel or the like and readily replaced when the cutting edges become dull. For example, the blades may be made of 57 tool steel hardened to 59 Rockwell.

The fixed jaw member 15 includes a base portion 21, an upright portion 22, and a blade support portion 23. The upright portion 22 which extends upwardly from the upper surface of the base portion has an apertured projection 24 extending laterally outward (or vertically as indicated by the dashed line in FIG. 2) defining a handle for the tool 10 for use as a hand held tool. The blade support portion 23 is a generally rectangular, flat member which extends laterally outward from the bottom surface of the base portion 21.

Similarly, the movable jaw member 16 includes a base portion 27, an upright portion 28 and a blade support portion 29. The upright portion 28 extends upwardly from the base portion 27 and aligned in a generally parallel opposing relation with upright portion 22 of the fixed jaw member 15. The blade support portion 29 is a generally rectangular shaped flat member which extends laterally outward from the bottom surface of the base portion 27, parallel to blade portion 23 of the fixed jaw member.

The drive apparatus 17 includes a drive cylinder 31, a drive rod 32 and a guide rod 33. The drive apparatus is disclosed as being hydraulically operated, but could be powered by air or electrically. One end of the cylinder 31 terminates in a square collar 34 which facilitates attachment of the drive apparatus 17 to the fixed jaw member 15. The other end of the cylinder is closed by a generally cylindrical cap 35 which defines a hand grip for the tool at one end thereof and which mounts an actuating switch 36 on its under surface locating the conveniently for operation by the user who grasps the handle 24 with one hand and the hand grip with the other hand, thus supporting the drive cylinder 31 at both ends thereof.

The working end of the drive rod 32 extends through an aperture 41 in the upright portion 22 of the fixed jaw member and through an aperture 42 in the upright portion 28 of the movable jaw member 16. Guide rod 33 has one end fixed to the base portion 27 of movable jaw member 16 and its other end extending through an aperture 43 in the fixed jaw member 15. The drive rod 32 is formed with threads which are received in threaded engagement with complimentary threads in aperture 42. A nut 44 holds the movable jaw member 16 to the drive rod 32.

Figure 5:
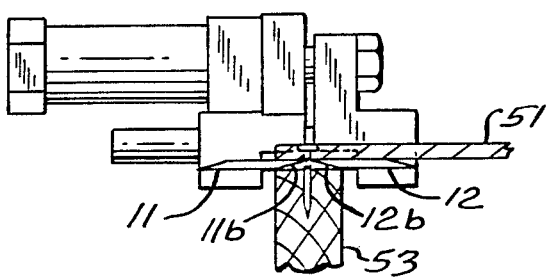
FIG. 5 illustrates the cutting tool after being powered, showing the blades moving toward one another to a cutting point.

Hydraulic fluid is supplied to or withdrawn from the cylinder 31 via hydraulic lines including a low pressure line 45 and a high pressure line 46 to drive the drive rod 32 axially of the cylinder 31 to drive the movable jaw member 14 relative to the fixed jaw member 15 in linear motion between an extended or open position as illustrated in FIG. 1 and a retracted or closed position as illustrated in FIG. 5, for example.

The blade support members 23 and 29 support respective cutting blades 11 and 12 offset laterally relative to the axis of the drive rod 32. The bevelled cutting edges of the cutting blades 11 and 12 are located coplanar opposing one another in a parallel relation spaced apart, when the tool is unactuated. The spacing between the blades is sufficient to enable placement of the blades at the cutting line where a pair of boards are fastened together.

For example, in the case of pallets having a plurality of deck boards nailed to a stringer, such as deck boards 51 and 52 and stringer 53, shown in FIGS. 2-6, the cutting blades easily pass through the space 54 between the boards. When the movable jaw member 16 is in its extended position as illustrated in FIG. 1, the cutting blades are spaced apart sufficiently to permit the cutting blades to straddle the stringer 53, the board located remote from the drive apparatus, with their cutting edges located extending along the cutting line, or point at which the deck board 51 is fastened to the stringer 53 by a fastener 55. The blades are oriented in complimentary symmetry fashion with their blades having a bevelled surface leading away from the cutting edge. This facilitates prying one board or member from another during a cutting cycle. The blades meet at their cutting edges when driven into engagement as shown in FIG. 5.

The base portions 21 and 27 of the jaw member 15 and 16 are cut back defining offset surfaces 21a and 27a, respectively, to provide clearance for the top edge of the stringer 53 when the tool is in its cutting position. When the movable jaw member 16 is driven to its closed position, as illustrated in FIG. 5, initially the blades wedge the boards apart, then the cutting edge 11b of blade 11 is driven in engagement with the cutting edge 12b of cutting blade 12 snipping the fastener.

Referring to FIGS. 2-6, by way of illustration, the power driven tool 10 is described with reference to an application for removing the deck board 51 from the stringer 53. Although the power driven tool 10 is described with reference to removing a deck board from a stringer of a wooden pallet, the tool can also be used to remove boards from crates, boxes, or the like or to snip the heads off nails protruding from the board.

Figure 2:
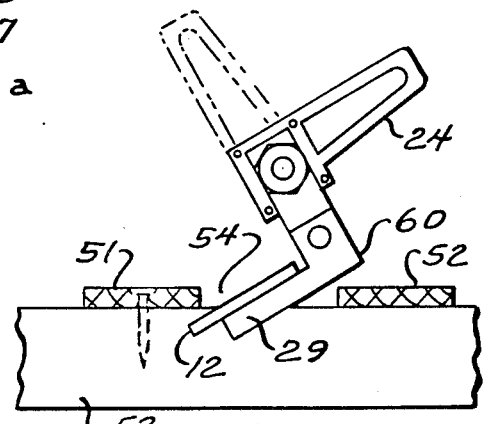
FIG. 2 illustrates the tool being used to remove a deck board from a stringer and illustrates the angle at which the cutting blades are inserted into the space between adjacent deck boards.
Figure 3:
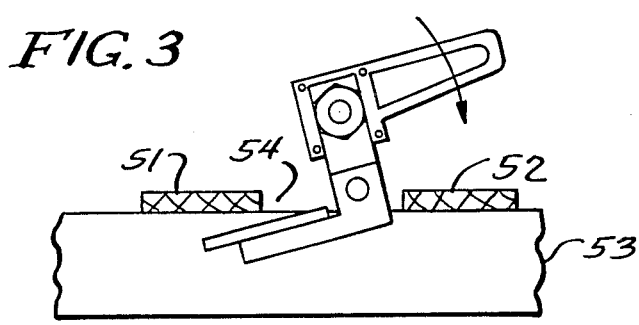
FIG. 3 illustrates the cutting tool rotated relative to its showing in FIG. 2.

Referring to FIGS. 2 and 3, in removing deck board 51 from stringer 53, the tool 10 is positioned with the cutting blades extending at an angle relative to horizontal, with the cutting blades straddling the stringer 53. The tool is moved inwardly to locate the blades beneath the width of the board 51 until the rear edge 60 of the tool clears the adjacent deck board 52. As shown in FIG. 3, the tool is then rotated in the direction of the arrow to a horizontal position until the cutting blades 11 and 12 reach the cutting line where the boards are fastened together.

Figure 4:
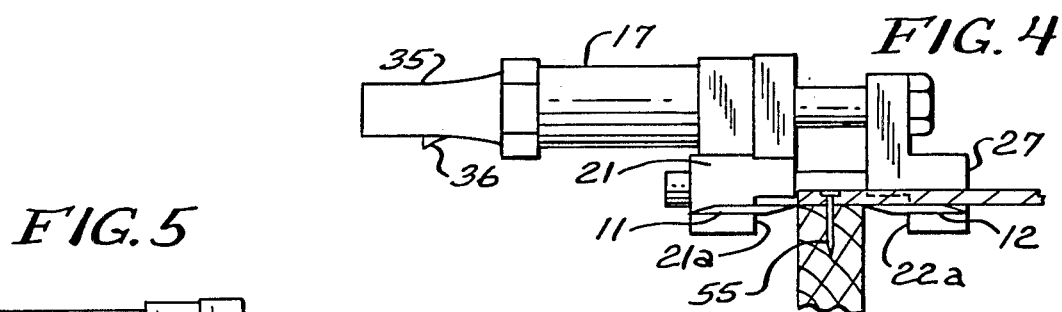
FIG. 4 illustrates the cutting tool in separating in cutting position, in a head on view, showing the blades in line with the point in which the deck board is fastened to the stringer.

In FIG. 4, the cutting blades 11 and 12 are shown located in separating and cutting position with the cutting blades 11 and 12 in line with the cutting line and located on opposite sides of the fastener. The tool is then powered by then actuating the switch 36 causing the hydraulic apparatus 17 to retract the drive rod 32 driving the movable jaw member 16 towards the fixed jaw member 15 as illustrated in FIG. 5. The offset surfaces 21a and 27a of the jaw members provide clearance for the top edge of stringer 53 and support members 23 and 29 locate the cutting edges 11b and 12b of the blades 11 and 12 well forward of the offset surfaces. As the blades 11 and 12 are driven together, their bevelled cutting edges 11b and 12b operate as wedges to drive the board 51 upwardly from the stringer 53 as illustrated in FIG. 5. When the edges of the blades 11b and 12b meet, the fastener 54 is severed, releasing the end of the board 51 from the stringer 53.

Figure 6:
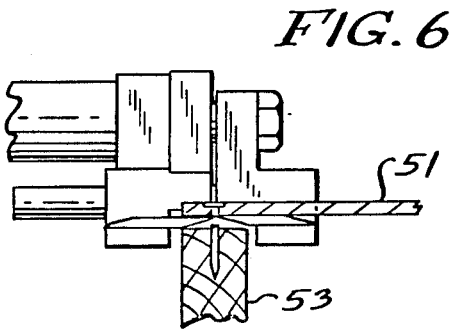
FIG. 6 illustrates the positioning of the blades after the cutting operation is completed.

As shown in FIG. 6, regardless which blade meets the most resistance during the cutting operation, the other blade will move to meet at the cutting point. Upon completion of the cutting movement, the blades may cross or simply stop at any point the cut is complete. The blades may not meet at cutting, but may come close enough to snip the fastener.

When fastener 54 has been severed, the user then moves the tool along the length of the board 51, from stringer to stringer, cutting the nails which connect the board to the stringers, without removing the nails. Once the board 51 has been removed, a replacement board can be nailed into place.

The power drive cutting action afforded by the cutting tool 10 makes it simple to use and allows rapid removal of a broken board, without damaging adjacent boards.

Having thus disclosed in detail a preferred embodiment of the invention, persons skilled in the art will be able to modify certain of the structures which have been described and to substitute equivalent elements for those disclosed while continuing to practice the principle of the invention. It is, therefore, intended that all such modifications and substitutions be covered as they are embraced within the spirit and scope of the appended claims.

I claim:

1. A power driven tool for severing a fastener which fastens together at least two members comprising: blade support means including first jaw means and second jaw means each including a main body portion and a blade support portion extending laterally outwardly from said main body portion in cantilever fashion, first and second cutting blades each having a cutting edge and mounted on said blade support portion of said first and second jaw means respectively, and drive means operatively coupled to said main body portion at least of said first jaw means for driving said first jaw means relative to said second jaw means in linear motion between an open position and a closed position, said blade support portions supporting said cutting blades offset laterally relative to the axis of said drive means and with their cutting edges in opposing, parallel relation and being spaced apart defining an open-ended gap therebetween when said first jaw means is in said open position and abutting one another when said movable first jaw means is in said closed position, and prior to actuation of said drive means, the gap between said cutting edges of said cutting blades corresponding in width to at least the width of one of the members to provide sufficient clearance between the blade cutting edges for receiving said one member therebetween permitting said one member to be received through the open end of the gap as said cutting blades are moved to straddle said one member to a position whereat their cutting edges extend along a cutting line where the members are fastened together by the fastener and located on opposite sides of the fastener, and when said drive means is then actuated driving said first jaw means to its closed position, said cutting blades are driven together, initially wedging said members apart then snipping the fastener located therebetween as the cutting edge of said second cutting blade is driven into engagement with the cutting edge of said first cutting blade.

2. A power driven tool according to claim 1, wherein each of said cutting blades is a flat elongated member generally rectangular in shape bevelled along at least one of its sides defining said cutting edge.

3. A power driven tool according to claim 2, wherein each said cutting blade is removably secured to its associated jaw means.

4. A power driven tool according to claim 3, wherein each said cutting blade has a bevelled cutting edge extending along parallel sides, said cutting blades being identical and each blade being reversibly positionable on its jaw means.

5. A power driven tool for severing a metal fastener which fastens together at least two members comprising: blade support means including fixed jaw means and movable jaw means, first and second cutting blades each having a cutting edge and mounted on said fixed and movable jaw means respectively, each of said cutting blades including a flat elongated member generally rectangular in shape bevelled along at least one of its sides defining said cutting edge, said fixed jaw means and said movable jaw means each having a base portion, an upright portion extending upwardly from said base portion, and a blade support portion extending laterally outward from the base portions of associated jaw means, said drive means including a reciprocating rod guided by said upright portion of said fixed jaw means and secured to said upright means of said movable jaw means for driving said movable jaw means along a linear axis between said open and closed positions, said blade support means supporting said cutting blades offset laterally relative to the axis of said drive means and with their cutting edges in opposing, parallel relation and being spaced apart when said movable jaw means is in said open position and abutting one another when said movable jaw means is in said closed position, and prior to actuation of said drive means, said cutting blades being spaced apart sufficiently to straddle the member remote from said drive means with their cutting edges extending along a cutting line where the members are fastened together by the fastener and located on opposite sides of the fastener, and when said drive means is then actuated driving said movable jaw means to its closed position, said cutting blades are dirven together, initially wedging said members apart then snipping the fastener located therebetween as the cutting edge of said second cutting blade is driven into engagement with the cutting edge of said first cutting blade.

6. A power driven tool according to claim 5, wherein the lower portions of opposing surfaces of said base portions of said jaw means are cut back defining offset surfaces for receiving the upper edge of the member closest to said drive means when the tool is positioned with its cutting blades straddling the member remote from said drive means.

7. A power driven tool according to claim 6, wherein each of said blade support means has a generally rectangular top surface for supporting its cutting blade with the top surface thereof aligned with the offset surfaces of said base portions.

8. A power driven tool according to claim 5, wherein said drive means includes hydraulic means for driving said reciprocating rod in moving said movable jaw means between said open and closed positions.

9. A power driven tool for severing a metal fastener which fastens together at least two members comprising: first and second elongated cutting blades each having at least one cutting edge, blade support means including fixed jaw means and movable jaw means, each having a base portion, an upright portion extending upwardly from said base portion, and a blade support portion extending laterally outward from said base portion, and drive means including a reciprocating rod guided by the upright portion of one of said jaw means and secured to the upright portion of the other one of said jaw means for driving said movable jaw means relative to said fixed jaw means in linear motion between an open position and a closed position, said blade support portions of said fixed and movable jaw means extending parallel to one another, supporting said cutting blades offset laterally relative to the axis of said drive means and with their cutting edges in opposing, parallel relation, and being spaced apart when said movable jaw means is in said open position and abutting one another when said movable jaw means is in said closed position and prior to actuation of said drive means, said cutting blades being spaced apart sufficiently to permit said cutting blades to straddle the member remote from said drive means with their cutting edges located extending along a cutting line where the members are fastened together and located on opposite sides of the fastener, and when said drive means is then actuated, said movable jaw means being driven towards said closed position and the cutting edges of said cutting blades being driven into engagement, initially wedging said members apart then snipping the fastener located therebetween.

10. A power driven tool according to claim 9, wherein each of said cutting blades is a flat elongated member generally rectangular in shape bevelled along each of its sides defining first and second cutting edges.

11. A power driven tool according to claim 10, wherein each of said cutting blades is reversibly positionable on its blade support means.

12. A power driven tool according to claim 9, wherein opposing surfaces of said base portions have offset lower srufaces and wherein each blade support portion has a generally rectangular top surface for supporting its associated cutting blade with the top surface thereof aligned with the offset lower surfaces of said base portions.

13. A power driven tool according to claim 10, wherein the bevelled cutting edges of each of said cutting blades are located forward offset surfaces of the base portion to insure engagement of said cutting edges of said first and second cutting blades when said movable jaw means is driven to said closed position.

14. A power driven tool according to claim 9, wherein said upright portion of said fixed jaw means further defines a handle for the user, and wherein said drive means defines a hand grip for said tool and mounts an operating switch for actuating said drive means.

15. A power driven tool according to claim 9, wherein said drive means further comprises a guide rod extending parallel to said reciprocating rod and having one end attached to said fixed jaw means and its other end extending through an aperture in said movable jaw means.

16. A power driven tool for use in removing boards from a pallet having a plurality of parallel extending stringers and a plurality of deck boards positioned transversely of the stringers, spaced apart from one another, and fastened to the stringers by fasteners, said tool comprising: first and second cutting blades each having a bevelled cutting edge, blade support means including fixed jaw means and movable jaw means, said fixed jaw means having a main body portion and a first blade support member extending laterally outward therefrom supporting said first cutting blade, said movable jaw member having a main body portion and a second blade support member extending laterally outward therefrom supporting said second cutting blade, and drive means operatively coupled to said main body portion of said movable jaw means for driving said movable jaw means relative to said fixed jaw means in linear motion between an open position and a closed position, said first and second blade support members supporting said cutting blades offset laterally relative to the axis of said drive means with their cutting edges in opposing parallel relation and being spaced apart defining an open-ended gap therebetween when said movable jaw means is in said open position and abutting one another when said movable jaw means is in said closed position, and prior to actuation of said drive means, the gap between said cutting edges of said cutting blades corresponding in width to at least the width of a stringer to provide sufficient clearance between the blade cutting edges for receiving a stringer therebetween permitting the stringer to be received through the open end of the gap as said cutting blades are moved to straddle the stringer with their bevelled cutting edges extending along a cutting line where a deck board is fastened to the stringer by a fastener and located on opposite sides of the fastener, and when said drive means is actuated driving said movable jaw member to said closed position, initially wedging the deck board from the stringer as said cutting blades are driven together, and then snipping the fastener as said cutting edges of said cutting blades are driven into engagement.

17. A power driven tool according to claim 16, wherein each blade support member is further offset vertically relative to said drive means to enable said blade support means to locate said cutting blades in straddling relationship with any one of said stringers and to permit said cutting edges of said cutting blades to be driven into engagement when said movable jaw means is driven to its retracted position.

18. A power driven tool for severing a fastener which fastens together at least two members comprising: first and second cutting blades having opposed parallel cutting edges, drive means including a housing and a drive member supported by said housing for linear reciprocating movement axially of said housing, said housing defining at least one handle means adpated to be gripped by the user while using the tool; blade mounting means supported on said housing and operatively coupled to said drive member, said blade mounting means defining parallel opposing blade support portions extending outwardly therefrom near the lower portion of said housing in cantilever fashion generally normal to the axis of said drive member, mounting said cutting blades offset laterally relative to the axis of said drive member with their cutting edges spaced from one another by a distance sufficient to straddle one of the members, permitting positioning of the tool with said housing and said handle portion located above said one member and with said cutting blades located substantially parallel to the surface of, and beneath, said one member with said cutting edges located on opposite sides of said one member and adjacent the fastener which fastens the members together; and means for applying power to said drive means to cause said drive means to move said cutting blades into cutting relation thereby snipping the fastener.

19. A method of removing boards from a pallet to be repaired, said pallet having a plurality of parallel extending stringers and a plurality of transverse deck boards spaced apart from one another, and fastened to the stringers by fasteners, comprising the steps of: providing a cutting assembly including a pair of cutting blades having opposing parallel cutting edges normally spaced from one another by a distance sufficient to straddle a stringer; positioning the cutting assembly with the cutting blades straddling one of the stringers and extending at an angle relative to the plane of the pallet with first ends of the blades located beneath a deck board to be removed and second ends located at a height above the deck board to be removed; rotating the cutting assembly to position the cutting blades substantially parallel to the surface of, and beneath, the deck board to be removed, with the cutting edges located on opposite sides of the stringer and adjacent a fastener which fastens said deck board to the stringer; and applying power to said cutting assembly to move said cutting blades into cutting relation thereby snipping the fastener.

20. A method according to claim 19, which includes wedging the cutting edges of the cutting blades between said deck board and the stringer to drive said deck board upwardly from the stringer prior to snipping the fastener.

* * * * *